(12) United States Patent
Noguchi

(10) Patent No.: US 7,219,921 B2
(45) Date of Patent: May 22, 2007

(54) CURTAIN AIRBAG SYSTEM AND GUIDE MECHANISM THEREOF

(75) Inventor: Atsushi Noguchi, Moriyama (JP)

(73) Assignee: Takata Corporation, Tokyo (JP)

(*) Notice: Subject to any disclaimer, the term of this patent is extended or adjusted under 35 U.S.C. 154(b) by 299 days.

(21) Appl. No.: 10/716,487

(22) Filed: Nov. 20, 2003

(65) Prior Publication Data

US 2004/0178608 A1    Sep. 16, 2004

(30) Foreign Application Priority Data

Mar. 13, 2003  (JP) .............................. 2003-068459
Jul. 3, 2003   (JP) .............................. 2003-191229

(51) Int. Cl.
    *B60R 21/16*  (2006.01)
(52) U.S. Cl. .................. 280/730.2; 280/743.2
(58) Field of Classification Search ............. 280/730.2, 280/728.2, 728.1, 743.1, 743.2
    See application file for complete search history.

(56) References Cited

U.S. PATENT DOCUMENTS

| | | | |
|---|---|---|---|
| 5,265,903 A | 11/1993 | Kuretake et al. | |
| 5,462,308 A | 10/1995 | Seki et al. | |
| 5,752,713 A * | 5/1998 | Matsuura et al. | 280/730.2 |
| 6,237,938 B1 | 5/2001 | Boxey | |
| 6,273,458 B1 * | 8/2001 | Steffens et al. | 280/730.2 |
| 6,312,009 B1 | 11/2001 | Håland et al. | |
| 6,431,588 B1 | 8/2002 | Bayley et al. | |
| 6,435,545 B1 * | 8/2002 | Osentoski et al. | 280/730.2 |
| 6,454,296 B1 * | 9/2002 | Tesch et al. | 280/730.2 |
| 6,527,296 B2 * | 3/2003 | Bakhsh et al. | 280/730.2 |
| 6,565,118 B2 * | 5/2003 | Bakhsh et al. | 280/730.2 |
| 6,637,769 B2 * | 10/2003 | Peer et al. | 280/730.2 |
| 6,688,641 B2 * | 2/2004 | Dominissini | 280/730.2 |
| 6,733,035 B2 * | 5/2004 | Thomas et al. | 280/730.2 |
| 6,783,152 B2 | 8/2004 | Tanase et al. | |
| 6,866,293 B2 * | 3/2005 | Ogata | 280/730.2 |
| 6,896,288 B2 * | 5/2005 | Tanaka et al. | 280/743.2 |
| 2002/0105172 A1 | 8/2002 | Peer et al. | |
| 2005/0046159 A1 * | 3/2005 | Noguchi et al. | 280/730.2 |
| 2005/0104345 A1 * | 5/2005 | Noguchi | 280/730.2 |
| 2005/0116450 A1 * | 6/2005 | Noguchi | 280/730.2 |

(Continued)

FOREIGN PATENT DOCUMENTS

JP          6-199197         7/1994

(Continued)

*Primary Examiner*—David R. Dunn
*Assistant Examiner*—Drew J. Brown
(74) *Attorney, Agent, or Firm*—Foley & Lardner LLP

(57) ABSTRACT

A guide mechanism for a curtain airbag for guiding a longitudinal end of the curtain airbag, the curtain airbag configured to be able to deploy downward along a side of an interior of a vehicle, includes: a guide member for the curtain airbag, configured to be vertically mounted to a pillar of the vehicle and configured to guide the airbag over a length of the guide member; and a pillar garnish configured to be mounted to the pillar and to cover the guide member, where the guide member and pillar garnish are configured to be mounted to the pillar so that a shortest distance between the guide member along the length and an interior surface of the pillar is less than or equal to a shortest distance between a side of the pillar garnish and the interior surface of the pillar.

17 Claims, 4 Drawing Sheets

U.S. PATENT DOCUMENTS

| | | | |
|---|---|---|---|
| 2005/0134027 A1* | 6/2005 | Noguchi et al. | 280/730.2 |
| 2005/0134029 A1* | 6/2005 | Noguchi et al. | 280/730.2 |
| 2005/0134030 A1* | 6/2005 | Noguchi et al. | 280/730.2 |
| 2005/0140124 A1* | 6/2005 | Noguchi et al. | 280/730.2 |
| 2005/0140125 A1* | 6/2005 | Noguchi et al. | 280/730.2 |
| 2005/0285378 A1* | 12/2005 | Noguchi et al. | 280/730.2 |

FOREIGN PATENT DOCUMENTS

| | | |
|---|---|---|
| JP | 2001-260796 | 9/2001 |
| JP | 2003-54351 | 2/2003 |
| JP | 2004-67045 A | 3/2004 |

* cited by examiner

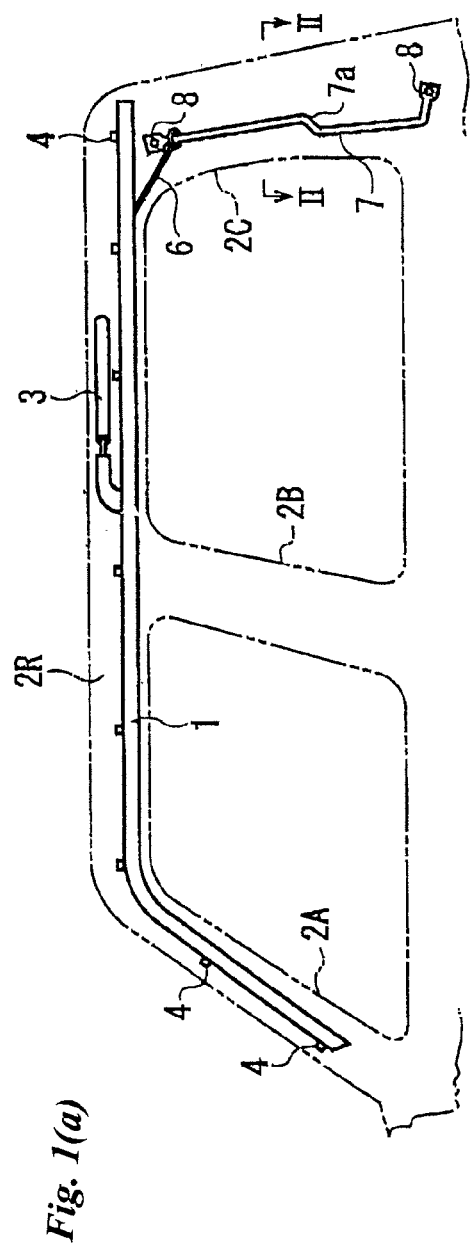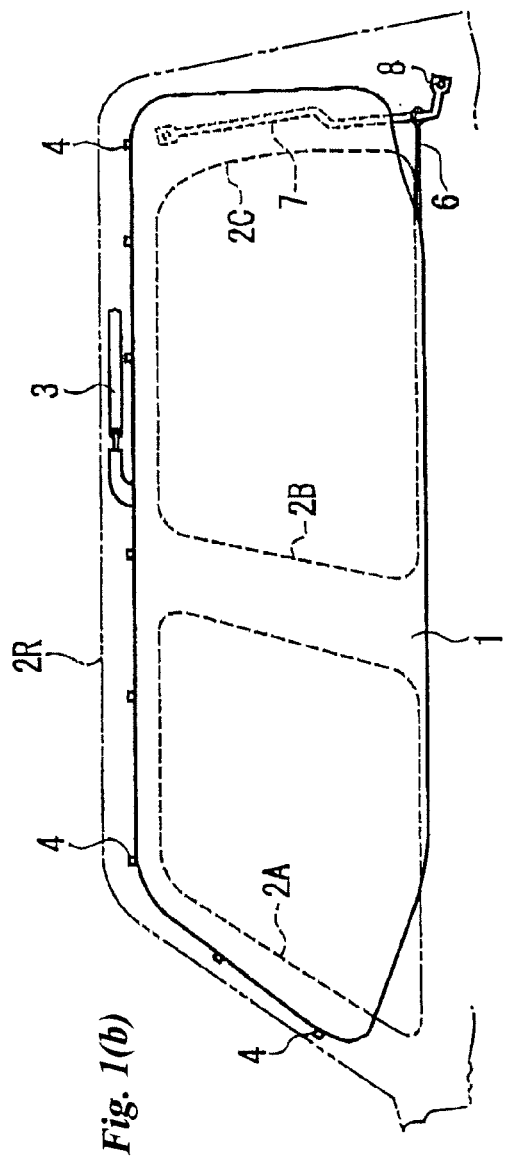
Fig. 1(a)
Fig. 1(b)

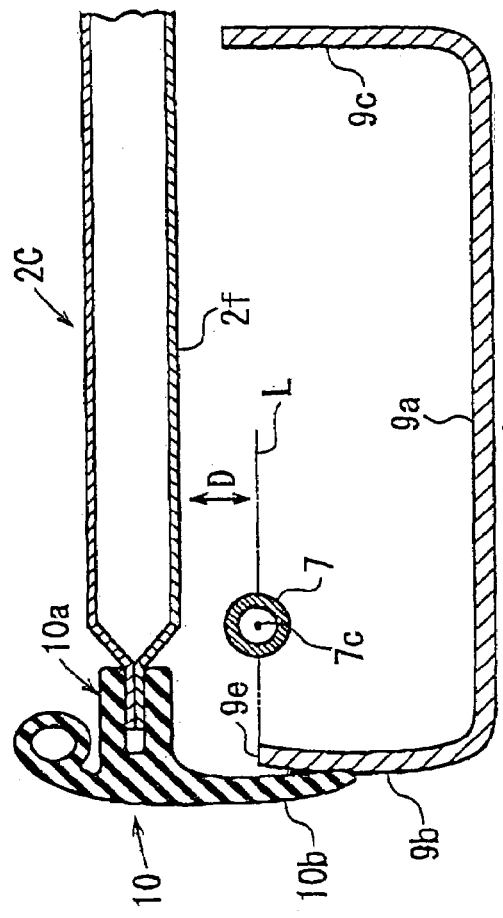
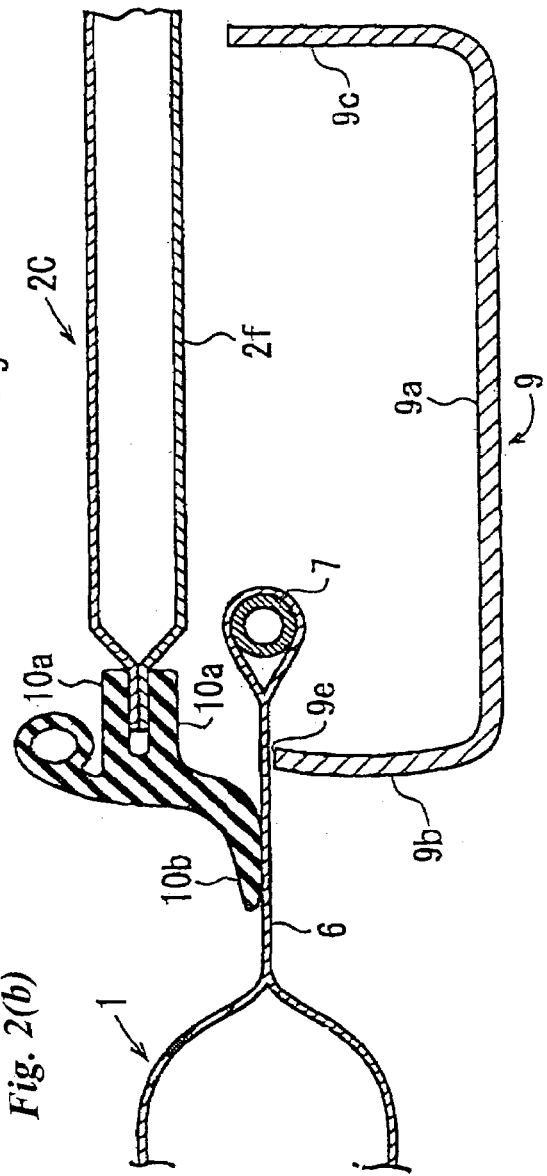
Fig. 2(a)
Fig. 2(b)

CURTAIN AIRBAG SYSTEM AND GUIDE MECHANISM THEREOF

CROSS-REFERENCE TO RELATED PATENT APPLICATIONS

The present application claims priority to Japanese Patent Application 2003-191229, filed Jul. 3, 2003, which claims priority to Japanese Patent Application 2003-68459, filed Mar. 13, 2003.

BACKGROUND OF THE INVENTION

The present invention relates to a guide mechanism for guiding a curtain airbag (curtain-like airbag) that is deployed along the side of the interior of a vehicle, and more specifically, concerns a guide member mounted to the pillar of the vehicle for guiding the longitudinal ends of the curtain airbag and a guide mechanism of a curtain airbag having a pillar garnish mounted to the pillar to cover the guide member.

In automobiles equipped with curtain airbag systems, the curtain airbag is inflated downward relative to a vehicle body along the side (such as a door and pillar) of the interior in the event of a side impact or rollover to protect the head of an occupant and to prevent the occupant from being thrown out of the vehicle when a window opens.

U.S. Pat. No. 6,237,938 discloses to provide a C-pillar with a guide member for guiding the rear end of the curtain airbag, which is inflated along the side of the interior, downward relative to the vehicle body and along the pillar.

The guide member disclosed in the patent includes a box-section member called a track and a slider member called an element arranged in the track and movable along the length of the track, a connecting strap called a tether at the rear end of the curtain airbag being connected to the element. Also there are provided one-way latches arranged at equal intervals substantially over the whole length of the track to prevent the slider member and the rear end of the curtain airbag, which has moved downward, from returning upward.

The track has mounting flanges at the upper and lower ends, each flange being mounted to the C-pillar with a bolt or a screw.

SUMMARY OF THE INVENTION

In general, the guide members are covered with pillar garnish. Upon inflation of the curtain airbag, the end of the curtain airbag slides downward with respect to the pillar garnish so as to tear open or to move the side of the pillar garnish away from the pillar.

With the related-art structure, the frictional resistance when the end of the curtain airbag slide with respect to the pillar garnish is high, as described above. Therefore, it is necessary to employ a high-output inflator to inflate the curtain airbag quickly.

It is an object of the present invention to provide a guide mechanism for a curtain airbag having low frictional resistance the end of the curtain airbag receives from the side of the pillar garnish upon inflation of the curtain airbag and that inflates downward quickly without the need for increasing the output of the inflator.

According to a preferred embodiment of the present invention, a guide mechanism for a curtain airbag is a guide mechanism for guiding the longitudinal ends of the curtain airbag that deploys downward along the side of the interior of a vehicle. The guide mechanism includes a guide member for a curtain airbag, extending vertically and mounted to a pillar of the vehicle; and a pillar garnish mounted to the pillar and covering the guide member. The distance between the guide member and the interior-side surface of the pillar is equal to or shorter than the distance between the side of the pillar garnish and the interior-side surface of the pillar.

In a preferred aspect, when the inflator is activated to inflate the curtain airbag downward, the end of the curtain airbag moves downward along the guide member. Since the distance between the guide member and the interior-side surface of the pillar is equal to or shorter than the distance between the side of the pillar garnish and the interior-side surface of the pillar, the end of the curtain airbag is subjected to low friction from the side of the pillar garnish when it moves downward. Therefore, the curtain airbag inflates downward quickly without the need for increasing the output of the inflator.

In another preferred aspect, the distance between the guide member and the interior-side surface of the pillar may be equal to or shorter than the distance between the side of the pillar garnish and the interior-side surface of the pillar, either from the upper end to the lower end of the guide member or at least in part of the section between the upper end and the lower end.

In another preferred aspect, the guide member may be a guide rod. In this case, the distance between the central axis of the guide rod and a surface of the interior-side surface of the pillar opposed to the guide rod is made equal to or shorter than the distance D between line L that passes the side of the pillar garnish and extends in parallel to the opposed surface and the opposed surface, so that the friction between the end of the curtain airbag that moves downward and the side of the pillar garnish can be sufficiently decreased.

In this case, preferably, the guide rod is fixed to the pillar at the upper end and the lower end thereof and the distance between the upper end and the lower end is substantially equal to the vertical width of the window opening on the side of the interior. With such a structure, the curtain airbag is guided from the upper end of a window opening on the side of the interior to the lower end by the guide rod.

In this case, the guide rod may extend substantially vertically in a straight line and the length of the guide rod may be substantially equal to the vertical width of the window opening on the side of the interior.

The size that is substantially equal to the vertical width of the window opening is about 80 percent to 120 percent of the vertical width of the window opening.

When the guide rod is used as a guide member, the curtain airbag may include a connecting strap extending from the end thereof and the connecting strap may be latched around the guide rod. The connecting strap may be latched around the guide rod. With such a structure, the connecting strap slides relative to the side of the pillar garnish to further decrease the frictional resistance with the side of the pillar garnish.

The connecting strap may extend from the lower end of the curtain airbag, which is apart from the side end of the curtain airbag. With such a structure, upon the deployment of the curtain airbag, the lower end of the curtain airbag which is apart from the side end of the curtain airbag is drawn to the guide rod with the connecting strap, so that the side rim of the curtain airbag nearer to the side end than that will cover the interior-side surface of the pillar (pillar garnish).

According to another preferred embodiment of the present invention, a guide mechanism for a curtain airbag is a guide mechanism for guiding the longitudinal ends of the curtain airbag that deploys downward along the side of the interior of a vehicle. The guide mechanism includes a guide member for a curtain airbag, extending vertically and mounted to a pillar of the vehicle; and a pillar garnish mounted to the pillar and covering the guide member. The side of the pillar garnish is arranged nearer to the interior than the guide member.

In a preferred aspect, the side of the pillar garnish is arranged nearer to the interior than the guide member, so that the end of the curtain airbag does not rub against the side of the pillar garnish when the inflator is activated to inflate the curtain airbag downward and move the end of the curtain airbag downward along the guide member in an automobile emergency. Therefore, the curtain airbag inflates downward quickly without the need for increasing the output of the inflator.

In another preferred aspect, the side of the pillar garnish may be arranged nearer to the interior than the guide member either from the upper end to the lower end of the guide member or at least in part of the section between the upper end and the lower end.

In another preferred aspect, the guide member may be a guide rod. Preferably, the guide rod is fixed to the pillar at the upper end and the lower end thereof and the distance between the upper end and the lower end is substantially equal to the vertical width of a window opening on the side of the interior. In this case, the guide rod may extend substantially vertically in a straight line and the length of the guide rod may be substantially equal to the vertical width of the widow opening on the side of the interior.

When the guide rod is used as the guide member, the curtain airbag may include a connecting strap extending from the end thereof; the connecting strap may be latched around the guide rod; and the side of the pillar garnish may be arranged nearer to the interior than the connecting strap. This simplifies the joint structure for the end of the curtain airbag with the guide rod and prevents the connecting strap from rubbing against the side of the pillar garnish.

In another preferred aspect, with such a structure, the connecting strap may extend from the lower end of the curtain airbag, which is apart from the side end of the curtain airbag. With such a structure, upon the deployment of the curtain airbag, the end of the curtain airbag, which is apart from the side end of the curtain airbag, is drawn to the guide rod. Therefore, the side rim of the curtain airbag nearer to the side end than that will cover the interior-side surface of the pillar (pillar garnish).

According to another preferred embodiment of the present invention, the guide mechanism for a curtain airbag is a guide mechanism for guiding the longitudinal ends of the curtain airbag that deploys downward along the side of the interior of a vehicle. The guide mechanism includes a guide member for a curtain airbag, extending vertically and mounted to a pillar of the vehicle; and a pillar garnish mounted to the pillar and covering the guide member. The end of the curtain airbag moves along the guide member without being bent by the side of the pillar garnish and the interior-side surface of the pillar upon the deployment of the curtain airbag.

In another preferred aspect, when the inflator is activated to inflate the curtain airbag downward in an automobile emergency, the end of the curtain airbag moves along the guide member without being bent by the side of the pillar garnish and the interior-side surface of the pillar, so that the end of the curtain airbag moves smoothly. Therefore, the curtain airbag inflates downward quickly without the need for increasing the output of the inflator.

The invention may be constructed such that, upon the deployment of the curtain airbag, the end of the curtain airbag moves along the guide member from the upper end of the guide member to the lower end or, alternatively, at least in part of the section between the upper end and the lower end without being bent by the side of the pillar garnish and the interior-side surface of the pillar.

In another preferred aspect, the guide member may be a guide rod. Preferably, the guide rod is fixed to the pillar at the upper end and the lower end thereof and the distance between the upper end and the lower end is substantially equal to the vertical width of a window opening on the side of the interior. In this case, the guide rod may extend substantially vertically in a straight line and the length of the guide rod may be substantially equal to the vertical width of the window opening on the side of the interior.

When the guide rod is used as a guide member, the curtain airbag may include a connecting strap extending from the end thereof, the connecting strap being latched around the guide rod. The connecting strap may be constructed to move along the guide rod without being bent by the pillar garnish and the interior-side surface of the pillar upon the deployment of the curtain airbag. This simplifies the joint structure for the end of the curtain airbag with the guide rod. Since the connecting strap moves along the guide rod without being bent by the side of the pillar garnish and the interior-side surface of the pillar upon the deployment of the curtain airbag, so that the connecting strap moves smoothly.

In another preferred aspect, with such a structure, the connecting strap may extend from the lower end of the curtain airbag, which is apart from the side end of the curtain airbag. With such a structure, upon the deployment of the airbag, the end of the curtain airbag, which is apart from the side end of the curtain airbag, is drawn to the guide rod through the connecting strap. Thus, the side rim of the curtain airbag nearer to the side end than that will cover the interior-side surface of the pillar (pillar garnish).

In another preferred aspect, the invention may include a weather strip mounted to the pillar and overlapping with the side of the pillar garnish. Because the weather strip is made of soft rubber, the friction resistance applied to the end of the airbag during the inflation of the airbag is decreased.

According to another preferred embodiment of the present invention, a curtain airbag system includes a curtain airbag that deploys downward along the side of the interior of a vehicle; and a guide mechanism for a curtain airbag for guiding the longitudinal ends of the curtain airbag. The guide mechanism includes a guide member for a curtain airbag, extending vertically and mounted to a pillar of the vehicle; and a pillar garnish mounted to the pillar and covering the guide member. The guide mechanism for a curtain airbag is a guide mechanism according to the invention.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

FIGS. 1(a) and 1(b) are schematic side views of a vehicle cabin equipped with a guide mechanism for a curtain airbag according to an embodiment of the present invention.

FIG. 2(a) is a sectional view taken along line II—II in FIG. 1(a) and FIG. 2(b) is a sectional view of a state in which a connecting strap is passing through the cross section of FIG. 2(a).

DETAILED DESCRIPTION

Embodiments of the present invention will be specifically described with reference to the drawings.

FIG. 1 is a schematic side view of a vehicle cabin equipped with a guide mechanism for a curtain airbag according to an embodiment of the present invention, FIG. 1(a) showing the curtain airbag in an uninflated condition and FIG. 1(b) showing the curtain airbag in an inflated condition; FIG. 2(a) is a sectional view taken along line II—II in FIG. 1(a); FIG. 2(b) is a sectional view of a state in which a connecting strap is passing through the cross section of FIG. 2(a); and FIG. 3 is a perspective view of a curtain airbag and a guide rod.

In the embodiment, a curtain airbag 1 is disposed from an A-pillar 2A of a car to a roof side 2R in a vertically long thin folded condition. The rear of the curtain airbag 1 extends forward relative to a C-pillar 2C. Symbol 2B denotes a B-pillar. The curtain airbag 1 starts to inflate with gas from an inflator 3 in the event of a side crash or turnover of the car to deploy downward relative to the car body along the side of the interior such as a door, the pillars 2A, 2B, and 2C.

Figure 3:
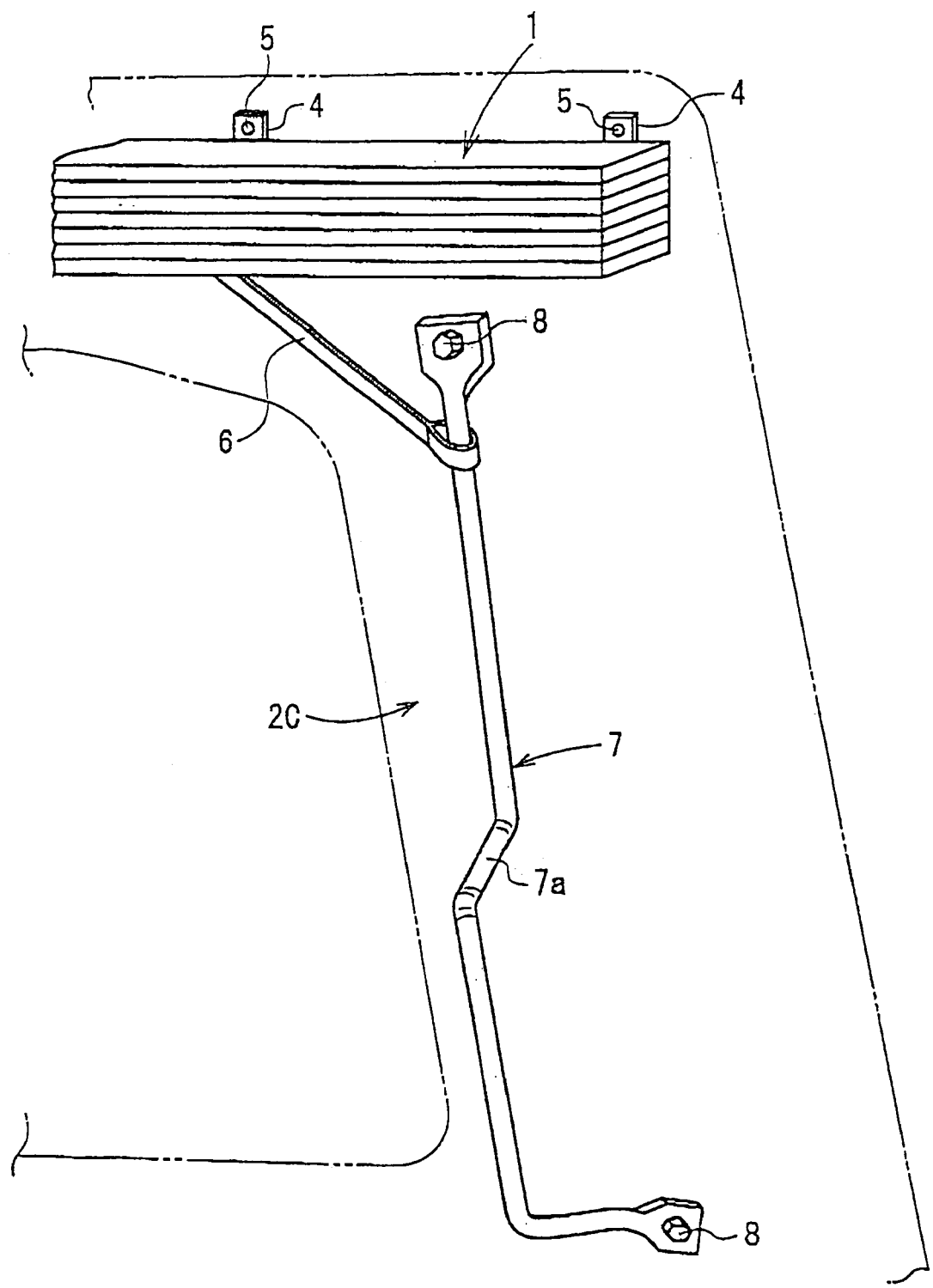
FIG. 3 is a perspective view of a curtain airbag and a guide rod.

As FIG. 3 shows, the curtain airbag 1 has projections 4 at the upper rim. The projections 4 are fastened to the roof side 2R with fasteners 5 such as bolts or screws. The front end of the curtain airbag 1 is fastened to the A-pillar 2A.

The automobile C-pillar 2C has a guide rod 7 serving as a guide member for guiding the rear end of the curtain airbag 1 along the C-pillar 2C when the curtain airbag 1 inflates downward relative to the car body along the C-pillar 2C. The guide rod 7 extends vertically relative to the car body along the C-pillar 2C.

The guide rod 7 extends over the whole moving range or at least part of the end of the curtain airbag 1 from the state in which the curtain airbag 1 is folded until a state in which it is fully deployed downwardly.

The curtain airbag 1 has a connecting strap 6 that extends from the rear backwardly, the connecting strap 6 being latched around the guide rod 7.

The guide rod 7 is composed of a rod, the upper end and the lower end being fixed to the C-pillar 2C with bolts 8. The intermediate portion of the guide rod 7 is bent in crank shape, thereby forming a mooring section 7a of the connecting strap 6. The mooring section 7a acts as a stopper for preventing the connecting strap 6 from retracting upward relative to the mooring section 7a.

The guide rod 7 is a predetermined distance apart from an interior-side surface 2f of the C-pillar 2C as a whole, except the upper and lower ends.

A-pillar garnish 9 is disposed to cover the interior-side surface of the C-pillar 2C. The pillar garnish 9 has a substantially-U shape having a main plate 9a substantially parallel to the interior-side surface 2f of the C-pillar 2C and side plates 9b and 9c that uprise from the main plate 9a toward the C-pillar 2C. The side plate 9b is located near the end of the C-pillar 2C adjacent to the door. The distance D between the rim 9e of the side plate 9b adjacent to the C-pillar 2C and the interior-side surface 2f of the C-pillar 2C is shown in FIG. 2(a). The distance D is defined as the distance between line L that passes the rim 9e and is parallel to the interior-side surface 2f and the interior-side surface 2f.

According to the embodiment, the central axis 7c of the guide rod 7 is positioned on the line L or nearer to the interior-side surface 2f than that. This makes the distance between the central axis 7c and the interior-side surface 2f equal to or shorter than the distance D between the rim 9e and the interior-side surface 2f.

As FIG. 2 shows, a weather strip 10 is mounted to the C-pillar 2C. The weather strip 10 has a clamp 10a made of a pair of parallel pieces. The clamp 10a holds the flange of the C-pillar 2C in between, so that the weather strip 10 is secured to the C-pillar 2C.

The weather strip 10 has a lip 10b that projects toward the interior, the lip 10b overlapping with the side plate 9b of the pillar garnish 9.

A pillar garnish provided to the A-pillar 2A and a pillar garnish provided to the roof side 2R cover the curtain airbag 1, which are not shown.

In the guide mechanism for the curtain airbag with such a structure, when the inflator 3 is activated in a side crash or a turnover of a vehicle, the curtain airbag 1 starts to inflate. The curtain airbag 1 pushes open the A-pillar garnish and the roof side garnish or breaks open them along a previously-provided fragile line to deploy downward along the side of the interior. In the rear of the curtain airbag, upon the deployment, the connecting strap 6 moves along the guide rod 7, and finally, the curtain airbag 1 reaches the lower part of the guide rod 7, as shown in FIG. 1(b), so that the lower rim of the curtain airbag 1 comes in a fully tensioned condition. The inflated curtain airbag 1 receives an occupant to absorb the impact and prevents the occupant from being thrown out of the car.

Referring to FIG. 2(b), the connecting strap 6 of the curtain airbag 1 moves downward along the guide rod 7 such that it pushes aside the lip 10b of the weather strip 10. In this case, the connecting strap 6 sometimes slides relative to the rim 9e of the pillar garnish 9; however, since the central axis 7c of the guide rod 7 is on the line L or nearer to the interior-side surface 2f than that, the friction between the connecting strap 6 and the rim 9e is significantly low. Therefore, the connecting strap 6 moves smoothly along the guide rod 7, so that the curtain airbag 1 inflates quickly. Also, this eliminates the necessity for a high-output inflator as the inflator 3.

The embodiment described above is an example of the invention and other modifications may be made. For example, while the aforesaid embodiment is constructed such that the curtain airbag 1 is connected to the guide rod 7 with the connecting strap 6, the body of the curtain airbag may be connected to the guide rod. The guide rod may be any other guide members.

According to the embodiment, the distance between the central axis 7c of the guide rod 7 and the interior-side surface 2f is equal to or shorter than the distance D between the rim 9e of the pillar garnish and the interior-side surface 2f, from the upper end to the lower end of the guide rod 7. According to the invention, however, the distance between the central axis 7c of the guide rod 7 and the interior-side surface 2f may be equal to or shorter than the distance D between the rim 9e of the pillar garnish and the interior-side surface 2f, only in at least part between the upper end and the lower end of the guide rod 7. For example, the distance between the central axis 7c of the guide rod 7 and the interior-side surface 2f may be longer than the distance D between the rim 9e of the pillar garnish and the interior-side surface 2f, at the lower part of the guide rod 7, and the lower part of the guide rod 7 may be arranged nearer to the interior than the end of the pillar garnish.

According to the embodiment, although the guide member (guide rod) is mounted to the C-pillar, the guide member may be mounted to any other pillars (such as a B-pillar or a D-pillar).

Figure 4A:
FIGS. 4(a) to 4(d) are perspective views of other structural examples of the guide rod.
Figure 4B:
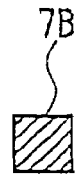
Figure 4C:
Figure 4D:

According to the embodiment, as FIG. 2 shows, the guide rod 7 is a hollow tube. According to the invention, however, the guide rod may be a solid rod like a guide rod 7A of FIG. 4(a). Both the guide rod 7 of FIG. 2 and the guide rod 7A of FIG. 4(a) are circular in section; however, according to the invention, the cross section of the guide rod is not limited to the circle and may be any other shapes. For example, the cross section of the guide rod may be a rectangle like a guide rod 7B of FIG. 4(b) or a polygon such as a hexagon like a guide rod 7C of FIG. 4(c), or alternatively, it may be an ellipse like a guide rod 7D of FIG. 4(d).

According to the invention, the material of the guide rod is not particularly limited and various materials such as metal and synthetic resins may be used.

As described above, according to the invention, the friction between the curtain airbag and the pillar garnish is decreased, so that the curtain airbag can inflate quickly.

The priority applications, Japanese Patent Application No. 2003-191229, filed on Jul. 3, 2003, and Japanese Patent Application No. 2003-068459, filed Mar. 13, 2003, are hereby incorporated by reference herein in their entireties.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. A guide mechanism for a curtain airbag for guiding a longitudinal end of the curtain airbag, the curtain airbag configured to be able to deploy downward along a side of an interior of a vehicle, the guide mechanism comprising:
    a guide member for the curtain airbag, configured to be vertically mounted to a pillar of the vehicle and configured to guide the airbag over a length of the guide member; and
    a pillar garnish configured to be mounted to the pillar and to cover the guide member,
    wherein the guide member and pillar garnish are configured to be mounted to the pillar so that a shortest distance between the guide member along said length and an interior surface of the pillar is less than or equal to a shortest distance between a side of the pillar garnish and said interior surface of the pillar,
    wherein longitudinal edges of the pillar garnish remain stationary during deployment of the curtain airbag.

2. A guide mechanism for a curtain airbag according to claim 1, wherein said length is an approximate distance from an upper end to a lower end of the guide member.

3. A guide mechanism for a curtain airbag according to claim 1,
    wherein the guide member is a guide rod, and
    wherein the guide rod and pillar garnish are configured to be mounted to the pillar so that a shortest distance between the interior surface of the pillar and a line substantially parallel to the interior surface of the pillar and passing through a center of the guide rod along said length is less than or equal to a shortest distance between the interior surface of the pillar and a line substantially parallel to the interior surface of the pillar and passing through an edge of the pillar garnish that is on a side toward the curtain airbag.

4. A guide mechanism for a curtain airbag according to claim 3, wherein said length is substantially equal to a vertical width of a window opening adjacent to the pillar.

5. A guide mechanism for a curtain airbag according to claim 4, wherein the guide rod is substantially straight.

6. A guide mechanism for a curtain airbag for guiding a longitudinal end of the curtain airbag, the curtain airbag configured to be able to deploy downward along a side of an interior of a vehicle, the guide mechanism comprising:
    a guide member connected to the airbag and configured to be vertically mounted to a pillar of the vehicle and configured to guide said longitudinal end of the airbag over the guide member during deployment of the airbag; and
    a pillar garnish having edges and configured to be mounted to the pillar and to cover the guide member;
    wherein the guide member and pillar garnish are configured to be mounted to the pillar so that said longitudinal end of the airbag is movable along the guide member without either the airbag or the pillar garnish being bent during deployment of the airbag.

7. A guide mechanism for a curtain airbag according to claim 6, wherein the guide member is a guide rod.

8. A guide mechanism for a curtain airbag according to claim 6,
    wherein the guide rod is configured to be mounted to the pillar at an upper end and a lower end of the guide rod, and
    wherein a distance between the upper end and the lower end is substantially equal to a vertical width of a window opening adjacent to the pillar.

9. A guide mechanism for a curtain airbag according to claim 7, wherein the guide rod is substantially straight.

10. A curtain airbag system, comprising:
    a pillar having an interior surface and configured to connect a main body of an automobile to a roof of the automobile;
    a curtain airbag configured to connect to the automobile and configured to deploy downward along an interior side of the automobile;
    a guide member connected to the pillar and configured to guide a longitudinal end of the airbag over the guide member during deployment of the airbag; and
    a pillar garnish connected to the pillar and configured to cover the guide member, the pillar garnish having edges,
    wherein the pillar garnish and guide member are arranged so that the pillar garnish is not deformed by the downwardly deploying airbag.

11. A curtain airbag system according to claim 10, wherein the longitudinal end of the airbag is movable along the guide member without being bent by any of said edges of the pillar garnish and the interior surface of the pillar throughout the deployment of the airbag.

12. A curtain airbag system according to claim 10, wherein said length is substantially equal to a vertical width of a window opening of said automobile adjacent to said pillar.

13. A curtain airbag system according to claim 10, wherein the guide member is a guide rod.

14. A curtain airbag system according to claim 13, wherein the guide rod is substantially straight.

15. A curtain airbag system according to claim 13, wherein the airbag comprises a connecting strap extending from said longitudinal end of the airbag and connected to the guide rod.

16. A curtain airbag system according to claim 13,
wherein the airbag comprises a lower end different from said longitudinal end, and
wherein the airbag comprises a connecting strap extending from said lower end of the airbag and connected to the guide rod.

17. A curtain airbag system according to claim 11, further comprising a weather strip mounted to the pillar and overlapping a side of the pillar garnish.

* * * * *